Patented Apr. 15, 1941

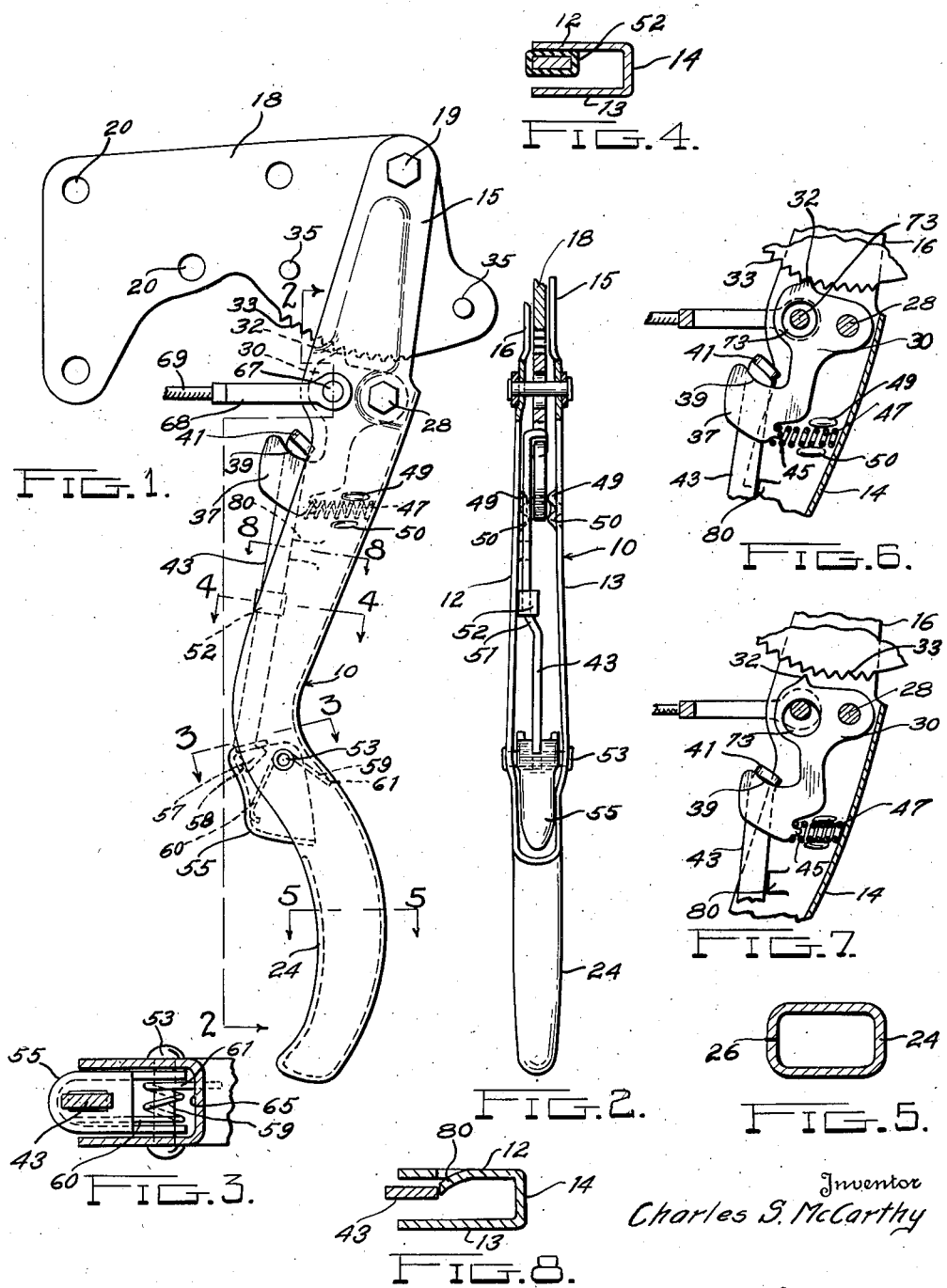

2,238,334

UNITED STATES PATENT OFFICE 2,238,334

MECHANISM CONTROL

Charles S. McCarthy, Toledo, Ohio, assignor to The Bingham Stamping Company, a corporation of Ohio Application August 24, 1939, Serial No. 291,732

9 Claims. (Cl. 74—537)

This invention relates to mechanism control, and more especially to lever mechanism for controlling the brakes of an automotive vehicle or the like.

The invention more particularly relates to a lever and clutch control wherein the arrangement of the elements comprising the same are such that they may be conveniently positioned adjacent the dash board of an automotive vehicle, thereby providing greater ease in which the operator of the vehicle may control the emergency brakes of the same.

The invention contemplates a particular arrangement of lever mechanism wherein the elements are so related that assembly of the completed unit is greatly simplified thereby providing a saving in time and labor during manufacture.

The invention further contemplates a lever and clutch mechanism wherein the clutch is urged toward clutching position independently of the means for releasing the clutch.

A further object of the invention resides in the provision of a lost motion connection between the clutch element and the clutch releasing mechanism whereby the clutch element is normally urged into engagement with its clutching surface unhampered by the releasing mechanism, which arrangement facilitates the assembly as a fixed connection between the clutch and releasing mechanism is thereby eliminated.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view of a lever arrangement of the invention;

Figure 2 is a front elevational view of a portion of the arrangement shown in Figure 1;

Figure 3 is an enlarged transverse sectional view taken substantially on the line 3—3 of Figure 1;

Figure 4 is an enlarged fragmentary sectional view taken substantially on the line 4—4 of Figure 1;

Figure 5 is an enlarged sectional view taken on the line 5—5 of Figure 1;

Figure 6 is an enlarged detail sectional view of the clutch arrangement of the invention showing the same in clutch engaging position;

Figure 7 is a view of the clutch arrangement similar to Figure 6 showing the clutch in released position;

Figure 8 is an enlarged sectional view taken substantially on the line 8—8 of Figure 1.

Referring to the drawing in detail, a lever 10 is illustrated preferably formed of sheet metal or other suitable material and having a U-shaped configuration throughout the greater portion of its length. The lever 10 includes side walls 12 and 13 and a bight portion 14 and as particularly shown in Figures 1 and 2 terminates at its upper end to form projecting parallel portions 15 and 16. The portions 15 and 16 are spaced in order to straddle a supporting bracket 18 to which the lever is pivotally secured as by a rivet 19 received in aligned openings provided in portions 15 and 16 in conjunction with an opening provided in the bracket. The bracket 18 may be secured in a suitable operating position in an automotive vehicle as, for example, adjacent the dash board (not shown) and is provided with openings 20 to receive proper fastening means (not shown).

The U-shaped portion of the lever 10 terminates at its lower end in a suitably formed handle or grip portion 24 formed substantially rectangular in cross section as particularly shown in Figure 5 with the edge portions thereof abutting to form a seam 26. If desired, the abutting edges may be welded to form a more unitary construction but it has been found that the inherent stress of the formed metal is sufficient to cause the abutting edges to remain in fixed relation.

The side walls 12 and 13 of the lever beneath the projecting portions 15 and 16 are provided with aligned openings to receive a suitable stub shaft or pin 28 for pivotally supporting a pawl or clutch member 30 positioned intermediate the walls 12 and 13. The pawl is provided at its upper portion with a projection or tooth 32 adapted to cooperate with a serrated or clutch surface 33 formed on an edge of the bracket 18, the bracket being further provided with a pair of struck up projections or stops 35 protruding on one side thereof to limit the movement of lever 10. The pawl or clutch member 30 is formed with an extended lower portion 37 of hook-like configuration providing ledge 39 adapted to engage a lateral projection 41 formed on the upper extremity of a bar or pawl operating rod 43. The pawl 30 is further provided adjacent the inner lower extremity thereof with a projection 45 forming means to receive one end of a resilient member or expansive spring 47, The other end of spring 47 bears against the inner surface of the bight portion 14 of lever 10 and as particularly shown in Figures 6 and 7 and spring 47 is held in proper position by means of inwardly raised portions 49 and 50 which are provided by swaging or indenting the side walls 12 and 13 of the lever. Rod 43 is offset as at 51 in order that the upper portion of the rod may pass the pawl 30 as particularly shown in Figure 2. Surrounding the rod is an anti-rattling means 52 in the form of a sleeve of non-metallic material to eliminate noise because of vibrations of the vehicle.

A rivet or pin 53 is positioned in aligned openings adjacent the upper part of the handle portion 24, the pin extending through the walls 12 and 13 of the lever 10 and is held therein by means of its headed portions on the exterior surfaces of the lever side walls. The pin 53 serves to pivotally support a finger piece or trigger 55 positioned between the lever walls and preferably formed of sheet metal into hollow or cup-like configuration. The finger trigger is provided with an opening in the upper portion thereof to receive the hook-like lower extremity 57 of rod 43, the hook being of such configuration as to permit the pivotal movement of trigger 55 and is further provided with a ledge portion 58 as shown in Figure 3 which serves to normally prevent disengagement of the rod and finger trigger. A resilient member or spring 59 of hairpin shape having its central portions surrounding the pin 53 and leg portions 60 and 61 contacting respectively with a surface of the wall of the trigger 55 and the inner surface of wall 65 of the handle portion 24. Thus, the trigger 55 is continuously urged outwardly releasing the rod 43 from close engagement with ledge 39 formed on the pawl 30, thus providing a slight "lost motion" connection between the pawl and the releasing rod. In this position, as shown in Figures 1 and 6, the pawl 30 is free of engagement with the rod 43 thus permitting the spring 47 to urge the tooth 32 of the pawl into engagement with the toothed portion or clutch surface 33 formed on the bracket.

It is to be noted in order to facilitate ease of manufacture and assembly, the particular arrangement of the elements provide that the rod 43 is free from secured engagement with the pawl 30 and therefore affords easy assembly of the pawl and rod within the lever. The action of the pawl and releasing mechanism is enhanced by the use of separate spring means for the pawl as the latter may pass over the teeth of the clutch surface without affecting the releasing mechanism. Thus, when the trigger 55 is in its normal position the rod 43 is out of direct engagement with the pawl 30 and spring 47 is free to urge the pawl into engagement with the clutch teeth 33 as shown in Figure 6. However, when the rod 43 engages with the ledge 39 of pawl 30 by movement of the finger trigger forcing the pawl downwardly as shown in Figure 7, thereby releasing the pawl from engagement with the teeth 33, thus permitting the lever to be moved to brake releasing position.

The brake mechanism of the vehicle may be connected to the lever 10 through the medium of a clevis 68 and a cable 69 or other suitable actuating means, the side walls of lever 10 having aligned openings to receive a pin 67 passing through the extremity of the clevis 68. The pawl 30 in this form of the invention is provided with an enlarged opening 73 to accommodate the clevis pin and permit the pawl to oscillate about the axis of its support 23 without interference from the clevis connection as when the pawl is out of engagement with the clutch, as shown in Figure 7, the opening is sufficiently large to permit such movement of the pawl.

In order to prevent the rod 43 from riding upon the ledge 39 of the pawl because of the influence of spring 59 urging the rod in a clockwise direction as viewed in Figure 1, a stop or projection 80 is provided which serves to limit the movement of the rod in a clockwise direction and permits the free movement of the pawl without interference from the lateral portion 41 of the rod. This projection is preferably formed by striking or forcing inwardly a portion of the lever wall as indicated at 80 in Fig. 8.

In the operation of the arrangement of the invention with the parts shown in brake setting position, as in Figure 1, the braking mechanism may be released by the operator by the placing of the index or other finger upon the face of the trigger and depressing the same. This causes pivotal movement of the trigger about the pin 53 and draws the rod 43 downwardly to engage the pawl 30 moving the latter to effect a release of the tooth 32 from engagement with the serrated portion 33. The lever may be then swung clockwise to brake releasing position. It is to be noted that in order to effect actuation of the brakes it is only necessary to grasp the handle 24 of the lever and move same in a counterclockwise direction about the shaft 19 as the pawl will at all times be urged toward clutch position under the influence of spring 47, which serves to retain the pawl 30 in engagement with the serrated portion of the support at all times when the trigger is released.

It is apparent that within the scope of the invention, modifications and different arrangements may be made other than is herein disclosed, and the present disclosure is illustrative merely, the invention comprehending all variations thereof.

What I claim is:

1. In combination, mechanism control including a support having a clutching surface; a lever member formed of sheet metal having a portion pivotally connected to said support, said lever member having a hollow body portion terminating at its lower extremity in a handle portion; a clutch member carried by said lever and adapted for engagement with the clutching surface on said support; spring means directly engaging said clutch member for urging said member into engagement with said clutching surface; a finger trigger formed of sheet metal pivoted to said lever adjacent the handle portion; a bar having a portion movable into engagement with said clutch member and connected with said finger trigger; and a second spring means engaging said lever member and said finger trigger for urging the latter to its outermost position.

2. In combination, mechanism control including a support having a clutching surface; a lever member formed of sheet metal pivotally connected to said support, said lever member having a hollow body portion terminating at its lower extremity in a handle portion; a clutch member carried by said lever and adapted for engagement with the clutching surface on said support; spring means cooperating with said clutch member for urging said member into engagement with said clutching surface on said support; a finger trigger formed of sheet metal pivoted to said lever; a bar connected with said finger trigger; said bar having a lateral projection integrally formed at one end normally spaced from said clutch member and movable into engagement with said clutch member; and a second spring means cooperating with said finger trigger for urging the latter to its outermost position.

3. In combination, mechanism control including a support having a clutching surface; a lever member formed of sheet metal pivotally connected to said support, said lever member having a hollow body portion terminating at its lower extremity in a handle portion; a clutch member pivotally carried by said lever and adapted for engagement with the clutching surface on said support; spring means cooperating with said clutch member for urging said clutch member into engagement with said clutching surface on said support; a clutch releasing means including an element formed of sheet metal pivoted to said lever; a rod connected to said element and terminating adjacent said clutch member, said rod having a portion engageable with said clutch member; and a second spring means cooperating with said element for normally urging said rod out of engagement with the clutch member.

4. In combination, mechanism control including a support having a clutching surface; a lever member formed of sheet metal having a portion pivotally connected to said support, said lever member having a hollow body portion terminating at its lower extremity in a handle portion; a clutch member pivotally carried by said lever and adapted for engagement with the clutching surface on said support; spring means engaging said clutch member and said lever member for urging said clutch member into engagement with said clutching surface on said support; means formed in said lever for holding said spring in position for engagement with said clutch member; a finger piece formed of sheet metal pivoted to said lever adjacent the handle portion; a bar connected with said finger piece having its terminal portion spaced from said clutch member and movable with said finger piece into contacting engagement therewith for actuating said clutch member; and means cooperating with said finger piece for urging the latter to its outermost position moving the terminal portion of said bar out of engagement with said clutch member.

5. In combination, mechanism control including a support having a clutching surface; a lever member formed of sheet metal having a portion pivotally connected to said support, said lever member having a hollow body portion terminating at its lower extremity in a handle portion; a clutch member pivotally carried by said lever and adapted for engagement with the clutching surface on said support; spring means engaging said clutch member and said lever member for urging said clutch member into engagement with said clutching surface on said support; a finger piece formed of sheet metal pivoted to said lever adjacent the handle portion; means connecting with said finger piece for cooperation with said clutch member; and spring means cooperating with said finger piece for urging said connecting means out of engagement with said clutching means.

6. In combination, mechanism control including a support having a serrated surface; a lever member formed of sheet metal having projecting portions pivotally secured to said support, said lever member having a central portion of U-shaped cross section and terminating at its lower end in a grip portion; a pawl positioned between the walls of said lever member and pivotally connected thereto, said pawl being arranged for cooperation with the serrated surface on the support; pawl releasing means having a manipulating portion adjacent the grip portion of said lever; a clevis; a pin connecting said clevis with the side walls of said lever, said pawl having spaced from its pivotal point an enlarged opening forming a passage to accommodate the pin connecting said clevis to said lever whereby said pawl may be oscillated without interference from said clevis pin.

7. In combination, mechanism control including a support having a serrated surface; a lever member having a central body portion of U-shaped configuration, said lever having parallel wall portions straddling and pivotally connected to said support, said lever terminating at its lower end in a grip portion; a pawl pivoted to said lever member and positioned intermediate the side walls thereof; a spring contacting said pawl for urging the latter into engagement with the serrated surface on said support, the walls of said lever being formed with spaced indented portions to retain said pawl actuating spring in position between the side walls of said lever; pawl releasing means including a finger trigger pivoted to said lever member adjacent the grip portion thereof; connecting means between said finger trigger and said pawl for effecting a release of said pawl from the serrated surface; and spring means cooperating with said finger trigger for urging said finger trigger to its outermost position.

8. In combination, mechanism control including a support having a toothed surface; a lever formed of sheet metal having parallel side wall portions straddling and pivotally connected to said support; a pawl pivoted to said lever member; spring means for urging said pawl toward engagement with said toothed surface; said lever terminating at its lower extremity in a grip portion; a finger trigger pivoted to said lever member adjacent the grip portion; a rod connected to said finger trigger and terminating adjacent said pawl; said rod having a laterally extending portion at its upper extremity normally out of engagement with said pawl and arranged to withdraw said pawl from engagement with the toothed surface upon movement of said finger trigger toward the grip portion of said lever.

9. In combination, mechanism control including a support having a toothed surface; a lever formed of sheet metal having parallel side wall portions straddling and pivotally connected to said support; a pawl pivoted to said lever member; spring means for urging said pawl toward engagement with said toothed surface; said lever terminating at its lower extremity in a grip portion; a finger trigger pivoted to said lever member adjacent the grip portion; a rod connected to said finger trigger and terminating adjacent said pawl; said rod having an integrally formed laterally extending portion adapted for cooperation with said pawl for establishing a lost motion connection between said pawl and said finger trigger.

CHARLES S. McCARTHY.